(12) United States Patent
Chang et al.

(10) Patent No.: US 9,177,209 B2
(45) Date of Patent: Nov. 3, 2015

(54) TEMPORAL SEGMENT BASED EXTRACTION AND ROBUST MATCHING OF VIDEO FINGERPRINTS

(75) Inventors: Jane Wen Chang, Lexington, MA (US); Apostol Ivanov Natsev, Harrison, NY (US); John R. Smith, New York, NY (US)

(73) Assignee: SINOEAST CONCEPT LIMITED, Wanchai (HK)

( * ) Notice: Subject to any disclaimer, the term of this patent is extended or adjusted under 35 U.S.C. 154(b) by 2301 days.

(21) Appl. No.: 11/958,298

(22) Filed: Dec. 17, 2007

(65) Prior Publication Data

US 2009/0154806 A1    Jun. 18, 2009

(51) Int. Cl.
*G06K 9/00* (2006.01)
*G06F 17/30* (2006.01)

(52) U.S. Cl.
CPC ...... *G06K 9/00758* (2013.01); *G06F 17/30781* (2013.01); *G06K 9/00744* (2013.01)

(58) Field of Classification Search
CPC .......... G06K 9/00758; G06K 9/00744; G06F 17/30781
USPC ...................... 725/19, 25; 380/201
See application file for complete search history.

(56) References Cited

U.S. PATENT DOCUMENTS

| | | | |
|---|---|---|---|
| 5,953,439 A * | 9/1999 | Ishihara et al. | 382/107 |
| 7,194,752 B1 * | 3/2007 | Kenyon et al. | 725/22 |
| 7,375,731 B2 * | 5/2008 | Divakaran et al. | 382/190 |
| 7,912,894 B2 * | 3/2011 | Adams | 709/201 |
| 2003/0185417 A1 * | 10/2003 | Alattar et al. | 382/100 |
| 2004/0098225 A1 * | 5/2004 | Abe et al. | 702/181 |
| 2004/0260930 A1 * | 12/2004 | Malik et al. | 380/255 |
| 2005/0021568 A1 * | 1/2005 | Pelly et al. | 707/200 |
| 2005/0213826 A1 * | 9/2005 | Neogi | 380/201 |
| 2006/0187358 A1 * | 8/2006 | Lienhart et al. | 725/19 |
| 2007/0253594 A1 * | 11/2007 | Lu et al. | 382/100 |
| 2008/0310731 A1 * | 12/2008 | Stojancic et al. | 382/195 |
| 2009/0052784 A1 * | 2/2009 | Covell et al. | 382/209 |

OTHER PUBLICATIONS

"Filtering user-generated content", Bit Player, pp. 1-2, retrieved Oct. 25, 2007 http://opinion.latimes.com/bitp[layer/2007/03/filtering_userg.html.

(Continued)

*Primary Examiner* — Randy Flynn
(74) *Attorney, Agent, or Firm* — Morgan, Lewis & Bockius LLP

(57) ABSTRACT

A computer implemented method, apparatus, and computer program product code for temporal, event-based video fingerprinting. In one embodiment, events in video content are detected. The video content comprises a plurality of video frames. An event represents discrete points of interest in the video content. A set of temporal, event-based segments are generated using the events. Each temporal, event-based segment is a segment of the video content covering a set of events. A time series signal is derived from each temporal, event-based segment using temporal tracking of content-based features of a set of frames associated with the each temporal, event-based segment. A temporal segment based fingerprint is extracted based on the time series signal for the each temporal, event-based segment to form a set of temporal segment based fingerprints associated with the video content.

18 Claims, 7 Drawing Sheets

(56) References Cited

OTHER PUBLICATIONS

"The content-recognition bakeoff, parts 1 and 2", Bit Player, pp. 1-2, retrieved Oct. 25, 2007 http://opinion.latimes.com/bitp[layer/2007/09/the-content-rec.html.

Liedtke, "YouTube unveils anti-piracy filters" Yahoo News, Oct. 15, 2007,pp. 1-2.

Gentile, "Media, Web companies set copyright rules", Yahoo News, Oct. 18, 2007, pp. 1-3.

Hampapur et al., Comparison of Distance measures for Video Copy Detection, 2001 IEEE International Conference on Multimedia and Expo, 2001 IEEE, pp. 944-947.

Law-To et al., "Video Copy Detection: a Comparative Study", CIVR'07, Jul. 2007, Amsterdam, The Netherlands, 2007 ACM, pp. 1-8.

Law-To et al., "Robust Voting Algorithm Based on Labels of Behavior for Video Copy Detection", MM'06 Oct. 2006, Santa Barbara, California, 2006 ACM, pp. 946-955.

Massoudi et al., "A Video Fingerprint Based on Visual Digest and Local Fingerprints", 2006 IEEE, pp. 2297-2300.

Li et al., "Content-Based Video Copy Detection with Video Signature", 2006 IEEE, pp. 4321-4324.

Shen et al., "Towards Effective Indexing for very Large Video Sequence Database", SIGMOD 2005, Jun. 2005, Baltimore, Maryland, 2005 ACM. pp. 1-12.

* cited by examiner

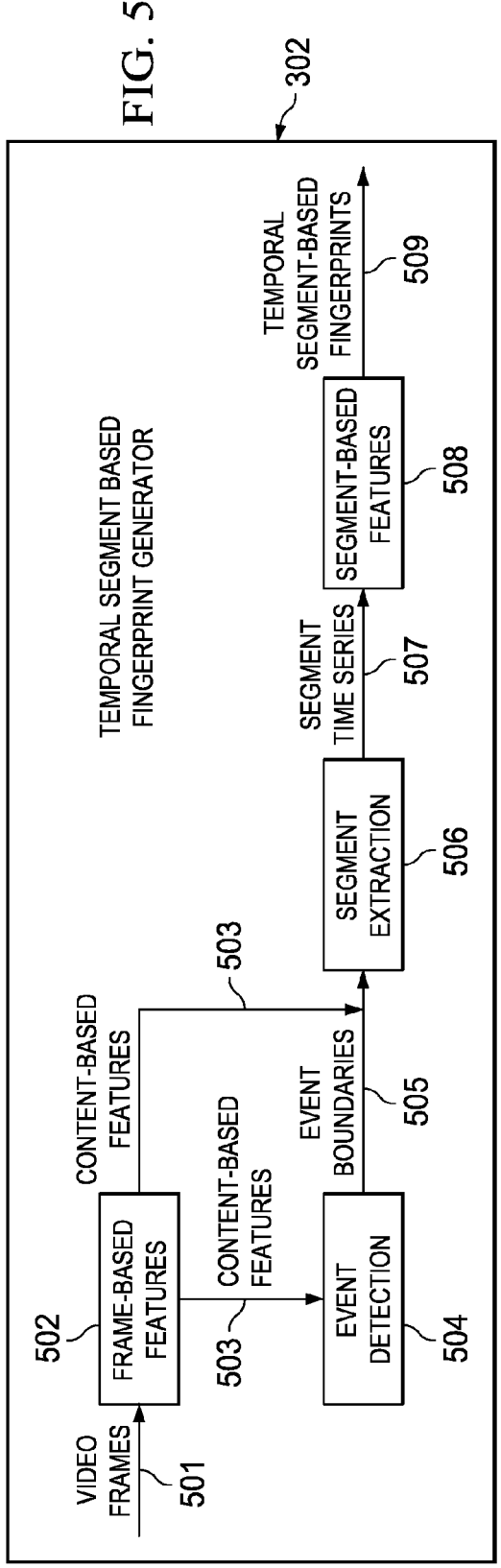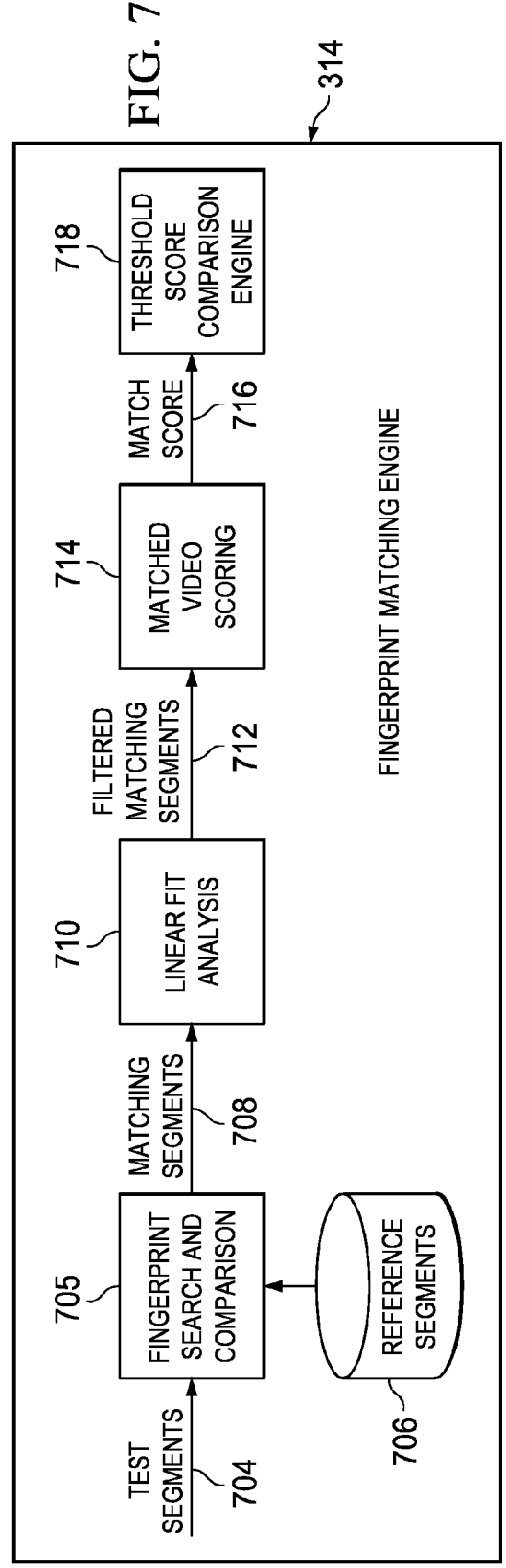

TEMPORAL SEGMENT BASED EXTRACTION AND ROBUST MATCHING OF VIDEO FINGERPRINTS

BACKGROUND OF THE INVENTION

1. Field of the Invention

The present invention is related generally to a data processing system and in particular to a method and apparatus for processing video. More particularly, the present invention is directed to a computer implemented method, apparatus, and computer usable program code for extraction and robust matching of segment based temporal video fingerprints for near-duplicate video identification and video piracy detection.

2. Description of the Related Art

As on-line digital content proliferates, and more and more people continue to access on-line media, there is a growing need to identify copyrighted content. For example, owners of copyrighted audio and video content are interested in identifying and removing unauthorized copies of their copyrighted content on social network and content sharing sites. Social network and content sharing sites permit users to post content, such as music, photos, and videos for viewing by other users of the website. Social network and content sharing sites include, without limitation, YouTube®, Facebook®, and MySpace®. The users of these social network and content sharing sites frequently utilize pirated movies, images, and/or television (TV) shows.

The owners of copyrighted audio and video content are also interested in identifying authorized appearances of their content in order to ensure the owners of the copyrights are compensated appropriately for each occurrence of the copyrighted content. For example, an owner may wish to ensure appropriate compensation is paid for each time that a particular song is played on the radio.

Advertisers on the other hand are interested in monitoring the appearances of their advertisements on television, radio, and/or the Internet, for example, in order to make sure advertising content is aired the appropriate number of times. These applications share in common the need to identify copies or near-duplicates of known copyrighted digital media, such as audio and/or video, from among a repository of unknown media, online videos, radio, and/or television.

Currently available solutions for identifying and protecting copyrighted content include watermarking and fingerprinting. Watermarking inserts a visible or invisible watermark into video content, which identifies the rightful owner of the content. The watermarking technology is designed so that the watermark is automatically transferred to any exact copies of the video as well as to any derivative content that is created based upon the watermarked piece of original content. Any such copies or derivative works, whether authorized or unauthorized, can be identified by scanning for the presence of the watermark embedded within the copied or derivative video content.

However, even though watermarks are designed to be difficult to remove without destroying the video content itself, watermarks can be defeated and removed. If a watermark is successfully removed, the video content becomes permanently unlocked and unauthorized duplication or derivation can no longer be monitored and/or detected via the watermark.

Due to the problems with watermarks, another approach, referred to as content-based fingerprinting and matching of content, has recently been gaining momentum because content-based fingerprinting does not rely on the presence of any watermark in the video content. With this approach, the entire piece of content is considered a "pseudo-watermark", and is summarized into one or more unique fingerprints that characterize the unique audio-visual aspects of the content. To identify whether two pieces of content are copies or derivatives of each other, the content-based fingerprints for the two pieces of content are compared. If the content-based fingerprints are sufficiently similar, the two pieces of content are declared copies, near-duplicates, or derivatives.

Content-based video fingerprinting includes audio-based fingerprinting methods, which uniquely characterize the audio track or the speech in a video. Content-based fingerprinting is also based on the extraction of key frames from the video, and using their visual characteristics to create visual key frame-based fingerprints. The collection of these frame-based fingerprints is then used to describe each video. The frame-based visual features can be global or local in nature. In other words, the frame-based visual features can be extracted from the entire frame or from one or more regions of a frame.

The content-based fingerprinting typically requires similar fingerprints that are invariant with respect to many common editing operations and image/video processing transformations. Common editing operations include, without limitation, cuts, splices, and/or re-ordering. Image/video processing transformations include, without limitation, cropping, scaling, aspect ratio changes, video re-capturing or re-compressing, global illumination changes, color space conversions, color reductions, data corruption and addition of noise.

Currently available content-based fingerprinting approaches work in varying degrees of success with respect to the range of plausible video transformations that are observed in video copies, primarily due to the fact that the successful matching of fingerprints requires complex frame alignment in addition to a robust frame-based fingerprinting technique. The frame-based fingerprinting technique should be invariant to most transformations.

Content-based fingerprinting becomes inaccurate and unreliable in the presence of frame alignment problems and missing or incorrectly sampled frames. Any image processing transformation that changes the visual appearance of the frames sufficiently can also defeat the frame-based matching approaches. In other words, current content-based fingerprinting is typically unable to detect copies and derivative video content where the video sample has been subjected to editing operations.

SUMMARY OF THE INVENTION

The illustrative embodiments provide a computer implemented method, apparatus, and computer program product code for temporal, event-based video fingerprinting. In one embodiment, events in video content are detected. The video content comprises a plurality of video frames. An event represents discrete points of interest in the video content. A set of temporal, event-based segments are generated using the events. Each temporal, event-based segment is a segment of the video content covering a set of events. A time series signal is derived from each temporal, event-based segment using temporal tracking of content-based features of a set of frames associated with the each temporal, event-based segment. A temporal segment based fingerprint is extracted based on the time series signal for the each temporal, event-based segment to form a set of temporal segment based fingerprints associated with the video content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram illustrating a segment based temporal fingerprint generator in accordance with an illustrative embodiment;

FIG. 7 is a block diagram of a fingerprint matching engine in accordance with an illustrative embodiment;

DETAILED DESCRIPTION OF THE PREFERRED EMBODIMENT

Figure 1:
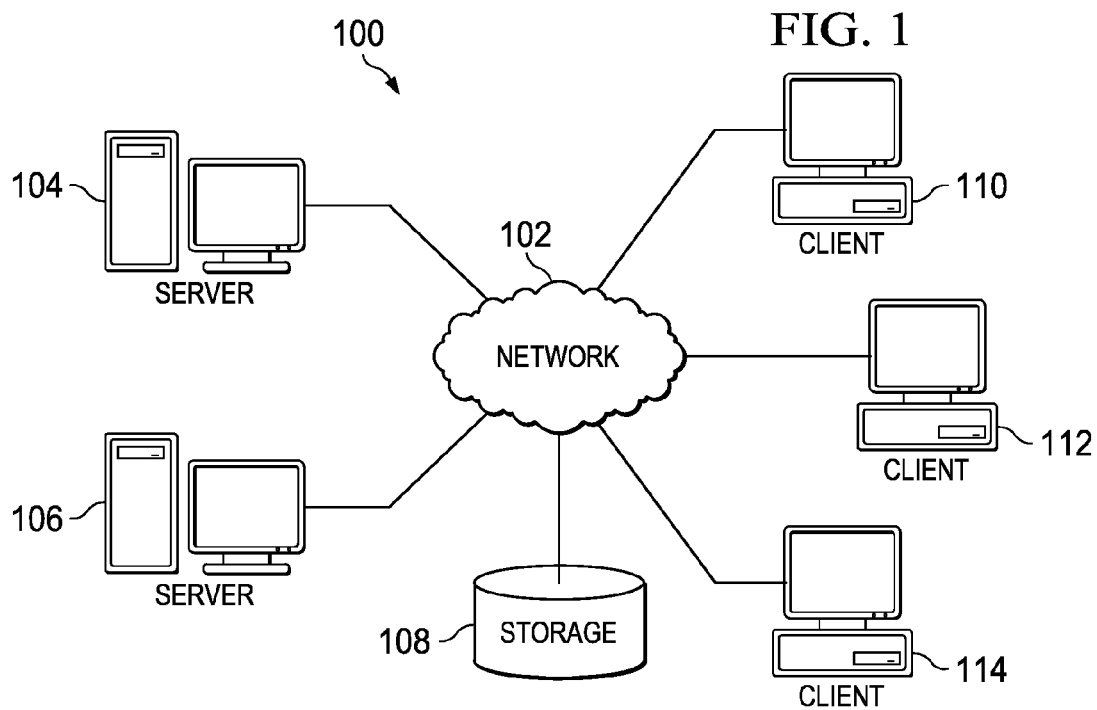
FIG. 1 is a pictorial representation of a network of data processing systems in which illustrative embodiments may be implemented.
Figure 2:
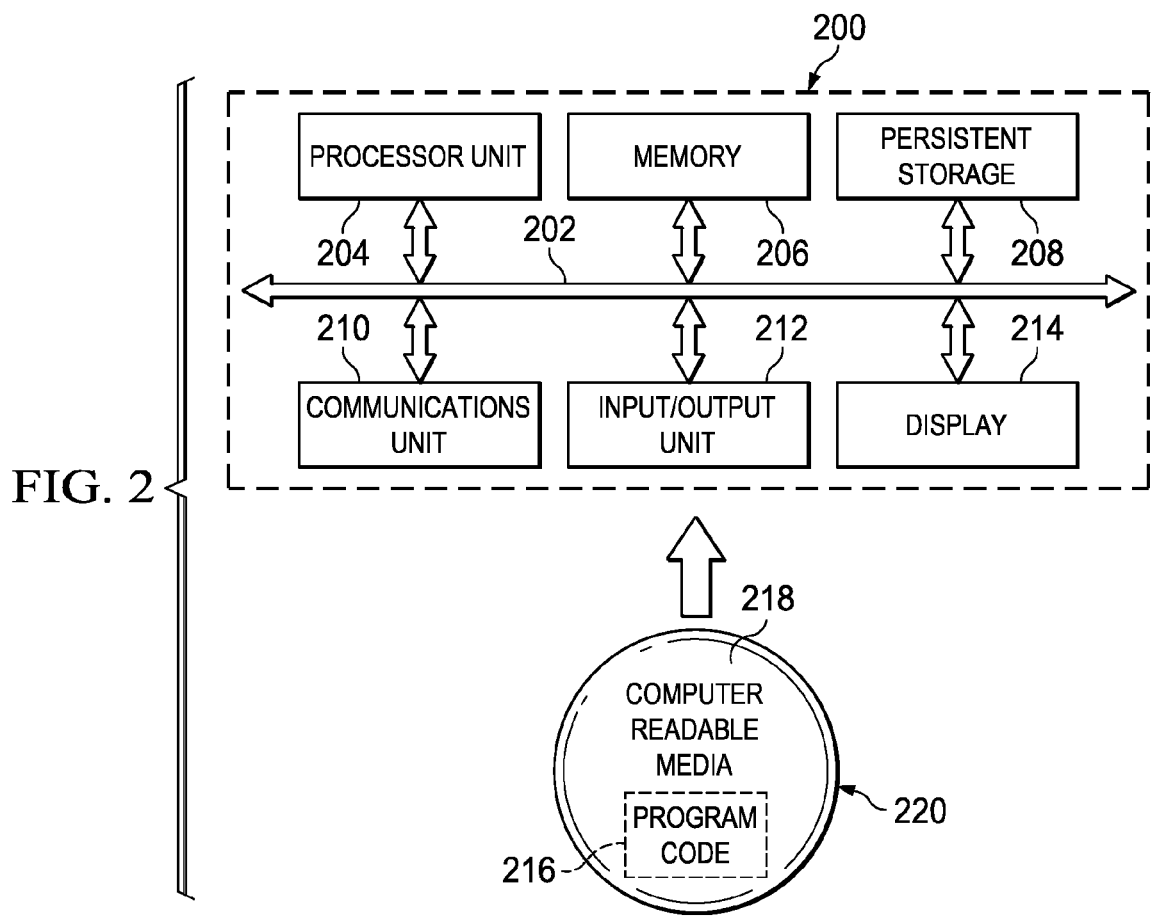
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With the proliferation of content sharing on the Internet, there is a growing need for improved identification of video content that is a copy or derivative of copyrighted material, as well as a need for improved detection of video piracy. Currently, watermarks may be inserted into video content to facilitate identification of copies and derivatives. Although watermarks are designed to be difficult to remove without destroying the video content itself, it is possible to defeat and remove watermarks from video content. When a watermark is successfully removed, the video content becomes permanently unlocked and unauthorized duplication or derivation can no longer be monitored and/or detected via the watermark.

In another solution, visual, content-based fingerprinting is used to identify copyrighted content. However, current visual, content-based fingerprinting becomes inaccurate and unreliable in the presence of frame alignment problems and missing or incorrectly sampled frames. In addition, any image processing transformation that sufficiently changes the visual appearance of the frames can also defeat prior art visual, content-based fingerprinting and frame-based matching approaches.

Furthermore, the illustrative embodiments recognize that prior art audio content-based fingerprinting may be inadequate because audio-based fingerprinting cannot recognize video duplicates which have identical visuals but modified audio tracks, such as, for example, movies with different sound tracks. In view of the foregoing and other exemplary problems, drawbacks, and disadvantages of the conventional methods and structures, the illustrative embodiments provide a method and apparatus for extraction of temporal segment based video fingerprints and matching of test video temporal segment based fingerprints with reference temporal segment based video fingerprints for the purposes of robust video piracy detection.

In one embodiment, the process detects events in video content. The video content comprises a plurality of video frames. The video frames may be optionally accompanied with a corresponding audio track. Video content may be a test video that is being tested to determine if the video content is a copy or derivative of known copyrighted video. The video content may also be known, copyrighted video content.

An event represents discrete points of interest in the video content. An event may be a significant change of state in audio, a change in visual content, or a change in semantic content of the video. For example, an event may be the appearance of a person or object in the video, a scene change, or a speaker change.

A set of temporal, event-based segments are generated based on the automatic detection of events in the video. The set may include a set of one or more temporal, event-based segments. Each temporal, event-based segment spans a set of one or more events.

A time series signal is derived from each segment based on temporal tracking of content based features associated with the ordered sequence of frames within each temporal, event-based segment. A content based feature is either an audio feature or a visual feature. The content based features may consist entirely of visual features, entirely of audio features, or a combination of audio features and visual features. A segment fingerprint summarizing and approximating the time series signal for each temporal, event-based segment is extracted to form a set of temporal segment based fingerprints associated with the video content.

The set of temporal segment based fingerprints are used to determine if a portion of a first video clip is a copy or derivation of the same original content as a second video clip. The process compares temporal segment based fingerprints for the first video clip with temporal segment based fingerprints generated for the second video clip. Matching event-based segments are identified based on a similarity measure between a temporal segment-based fingerprint associated with the first video clip and a temporal segment based fingerprint associated with the second video clip to form a matching segment.

All matching segments between the first video clip and the second video clip are collected to form a set of matching segments. The set of matching segments may include a single matching pair of event-based segments or two or more matching pairs of segments. A subset of matching segments that produces a good linear fit is selected from the set of matching segments.

An overall video match score for the first video clip and the second video clip is identified based on the non-overlapping duration of the selected matching segments in the subset of matching segments that produce a good linear fit. A determination is made as to whether the first video clip is a near-duplicate of the second video clip using the overall video match score.

Figure 3:
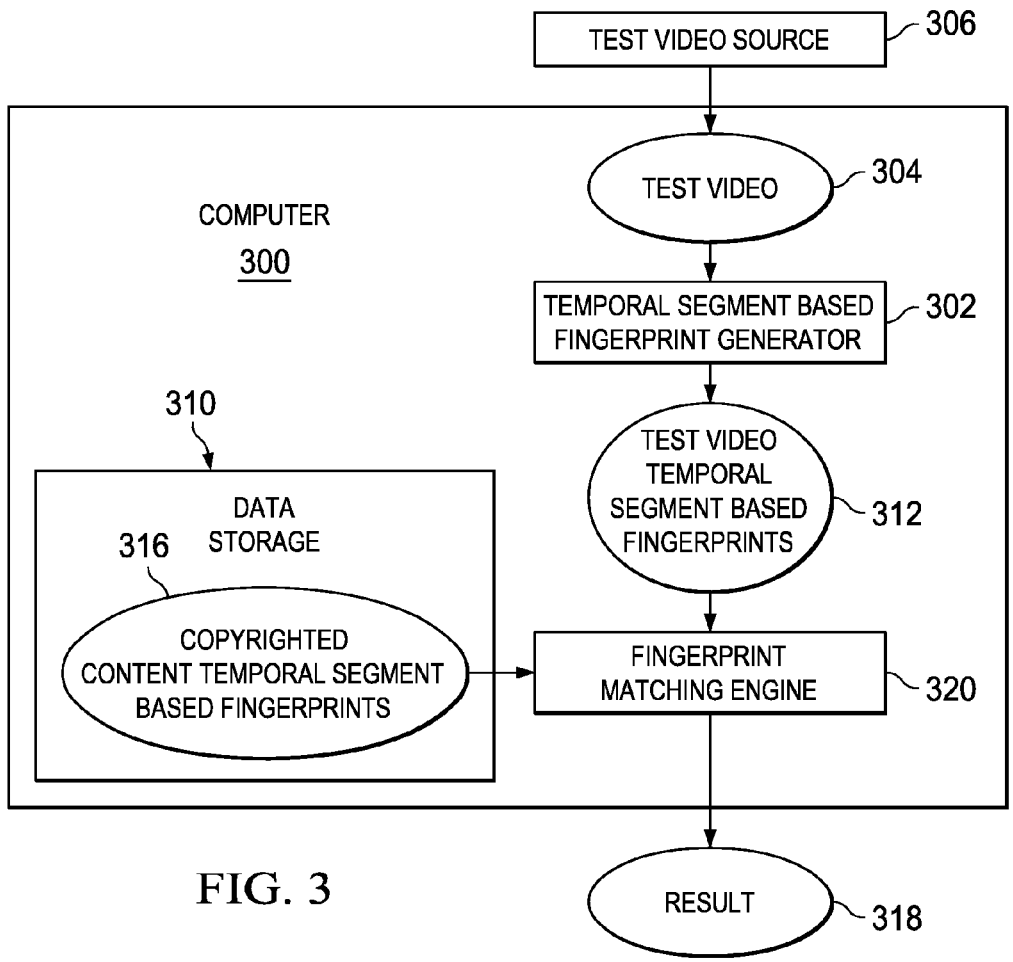
FIG. 3 is a block diagram illustrating generation of segment based temporal fingerprints for test video and matching against a reference database of fingerprints in accordance with an illustrative embodiment.

FIG. 3 is a block diagram illustrating generation of segment based temporal fingerprints for test video and matching against a reference database of fingerprints in accordance with an illustrative embodiment. Computer 300 is implemented in any general computing device, including, without limitation, server 106 or client 110 in FIG. 1, and data processing system 200 in FIG. 2.

Temporal segment based fingerprint generator 302 is a software component for generating temporal segment based fingerprints for video content. The video content may be test video 304 or known copyrighted content. Temporal segment based fingerprint generator 302 combines content-based features with the unique temporal signatures of test video 304 to generate temporal segment based fingerprints.

In this example, test video 304 is video content that is being tested against known copyrighted content to determine if test video 304 is a copy of copyrighted content or derived from copyrighted content. Test video 304 includes a plurality of video frames. The video frames may also optionally be accompanied by an audio track. In other words, test video 304 may be video only or a combination of audio and video.

Test video source 306 is a source of video content that is being tested or compared to known copyrighted content to determine if test video 304 is a copy or derivative of copyrighted content. Test video source 306 may be an online source or an offline source of video content. For example, test video source 306 may include, without limitation, a television program, a commercial, audio and/or video content on a website, or any other source. Examples of websites include, without limitation, YouTube®, Facebook®, and MySpace®.

Temporal segment based fingerprint generator 302 detects events in test video 304, forms segments aligned at event boundaries, extracts temporal traces of content-based descriptors for each segment, and generates test video temporal segment based fingerprints 312 for the test video 304. In this embodiment, test video temporal segment based fingerprints 312 are formed as an ordered sequence of numbers that summarize the temporal traces of visual and/or audio characteristics of each video segment. Aligning the segments at invariant event boundaries alleviates any frame alignment problems that may occur due to editing or alteration of video content. Temporal segment based fingerprint generator 302 generates test video temporal segment based fingerprints for test video 304 as well as copyrighted content temporal segment based fingerprints 316 for copyrighted video content. In this example, copyrighted content temporal segment based fingerprints 316 are stored permanently in data storage 310, while test video temporal segment based fingerprints 312 are generated on the fly and used only for matching and video copy identification purposes without being persisted. However, test video temporal segment based fingerprints may also be generated and stored in data storage 310 for matching against copyrighted content temporal segment based fingerprints 316 in an offline matching process, rather than generating test video temporal segment based fingerprints 312 online.

Data storage 310 is a device for storing data. Data storage 310 may be implemented as a hard drive, a flash memory, a main memory, read only memory (ROM), a random access memory (RAM), non-volatile random access memory (NVRAM), or any other type of data storage device. Data storage 310 may be implemented in a single data storage device or a plurality of data storage devices. In this example, data storage 310 is a local data storage device coupled to computer 300. However, in another embodiment, data storage 310 may be located remotely to computer 300, or data storage 310 may be implemented as one or more local data storage devices and one or more remote data storage devices.

Data storage 310 stores copyrighted content temporal segment based fingerprints 316 generated for copyrighted content. Copyrighted content may be any audio and/or video content that is known copyrighted content. Copyrighted content may be stored in a library or database having one or more known copyrighted video clips. Data storage 310 also stores copyrighted content temporal segment based fingerprints 316.

Temporal segment based fingerprint generator 302 generates copyrighted content temporal segment based fingerprints 316 for the known copyrighted video content. Copyrighted content temporal segment based fingerprint 316 includes one or more temporal segment based fingerprints. Copyrighted content temporal segment based fingerprints 316 are generated by temporal segment based fingerprint generator 302 either online or offline. In other words, computer 300 may be used to generate copyrighted content temporal segment based fingerprints 316 in the presence of a network connection or in an absence of a network connection. Temporal segment based fingerprint generator 302 then generates test video temporal segment based fingerprints 312 for test video 304. Fingerprint matching engine 320 then compares temporal segment based fingerprints 312 with copyrighted content temporal segment based fingerprints 316.

Fingerprint matching engine 320 is a software component for performing a temporal segment based fingerprint matching process. Fingerprint matching engine 320 compares test video temporal segment based fingerprints 312 with copyrighted content temporal segment based fingerprints 316. Result 318 indicates whether test video 304 is a copy or derivative of copyrighted content. The copy or derivative of copyrighted content may be referred to as a near-duplicate of copyrighted content. In one embodiment, detection of the near-duplicate is used for content-based video piracy detection or prevention purposes.

Thus, temporal segment based fingerprint generator 302 extracts frame-based content-based features for each frame in a plurality of frames associated with test video 304. The test video may include audio content corresponding to the video frames. The content-based features may be visual features and/or audio features. Temporal segment based fingerprint generator 302 detects events in the video content associated with test video 304 based on significant change in the content-based features. Temporal segment based fingerprint generator 302 then generates overlapping segments spanning one or more events to form a set of temporal event-based segments.

Temporal segment based fingerprint generator 302 then derives a timer series signal from each temporal, event-based segment based on temporal tracking of content-based features associated with each temporal, event-based segment. Temporal segment based fingerprint generator 302 extracts segment based fingerprints based on the time series signal for each segment to form test video temporal segment based video fingerprints 312.

Fingerprint matching engine 320 receives a test segment from test video 304. Fingerprint matching engine 320 compares the one or more temporal segment based fingerprints in copyrighted content temporal segment based fingerprints 316 with test video temporal segment based fingerprints 312. Fingerprint matching engine 320 identifies matching segments based on a similarity measure. Fingerprint matching engine 320 finds a subset of matching reference segments that produces a best linear fit.

A linear fit in this context refers to sets of matching segments that are consistent with respect to their temporal arrangement and relative temporal distances. In other words, there must be a linear relationship between the temporal position of matching segments in a pair of videos so that if a segment at time X from one video matches a segment at time Y in a second video, then Y=aX+b, where a and b are constant real numbers. A set of paired matching segments produce a linear fit if each pair of matching segments is related by the same linear relationship, where the constants a and b are the same, or nearly the same, for all matching pairs of segments. The quality of a linear fit of matching segments is based on the number of matching segment pairs that fit the same linear relationship, as well as the parameters a and b of the linear relationship.

Fingerprint matching engine 320 generates a video match score based on the best linear fit. In this example, if the video match score exceeds a threshold score, fingerprint matching engine 320 generates result 318 that identifies the test segment as potentially copied or derived from the reference video. If the video match score is less than the threshold, fingerprint matching engine 320 generates result 318 that identifies the test segment as not matching the reference video.

In one embodiment, a content owner with copyrighted content extracts temporal segment based fingerprints for the copyrighted video to generate copyrighted content temporal segment based fingerprints 316. These fingerprints are fine-grain temporal content-based fingerprints designed to be robust to a wide range of distortions. The temporal segment based fingerprints may then be used to detect video piracy and protect the copyrighted content from unauthorized usage.

In another example, a video sharing site may utilize temporal segment based fingerprint generator 302 to generate temporal segment based fingerprints for video posted on the video sharing site. The video sharing site may use fingerprint matching engine 320 to detect piracy and unauthorized usage of copyrighted video extracts by users of the video sharing site. In this example, test video 304 is video posted on the video sharing site by users of the site. Test video temporal segment based fingerprints 312 are matched against the reference database of copyrighted content temporal segment based fingerprints 316. This matching is also a fine-grain temporal content-based process designed to be robust to a wide range of distortions. It detects whether or not the shared video is a pirated copy of one of the copyrighted videos in the descriptor database.

Figure 4:
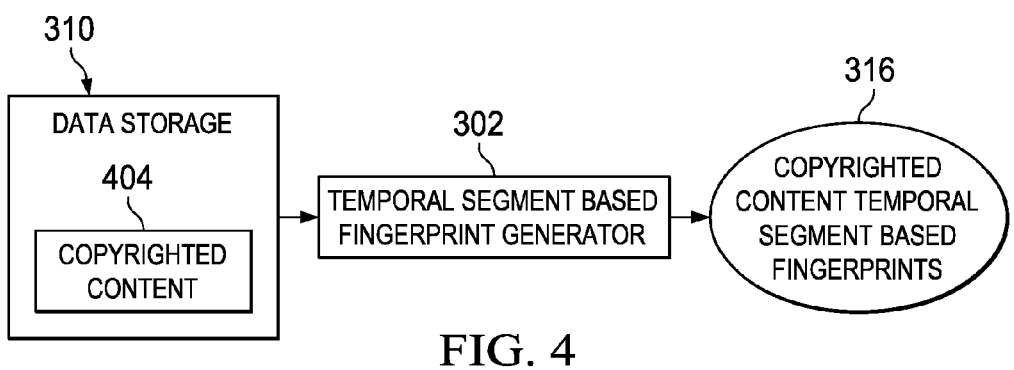
FIG. 4 is a block diagram illustrating generation of a reference database of temporal segment based fingerprints for copyrighted content in accordance with an illustrative embodiment.

FIG. 4 is a block diagram illustrating generation of a reference database of temporal segment based fingerprints for copyrighted content in accordance with an illustrative embodiment. Temporal segment based fingerprint generator 302 generates copyrighted content temporal segment based fingerprints 316 for copyrighted content 404 in the same manner that temporal segment based fingerprint generator 302 generated test video temporal segment based fingerprints 312 for test video 304 in FIG. 3.

Data storage 310 stores copyrighted content 404. Copyrighted content 404 may be implemented using any audio and/or video content that is known copyrighted content. In this example, copyrighted content 404 is a library or database having one or more known copyrighted video clips. Copyrighted content temporal segment based fingerprints 316 contain temporal segment based fingerprints for known copyrighted video content, such as copyrighted content 404.

Temporal segment based fingerprint generator 302 generates copyrighted content temporal segment based fingerprints 316 for copyrighted content 404 either online or offline. In other words, temporal segment based fingerprint generator 302 may be used to generate copyrighted content temporal segment based fingerprints 316 in the presence of a network connection or in an absence of a network connection. Temporal segment based fingerprint generator 302 then generates test video temporal segment based fingerprints 312 for test video 304 as in FIG. 3. Fingerprint matching engine 320 then compares temporal segment based fingerprints 312 as in FIG. 3 with copyrighted content temporal segment based fingerprints 316.

FIG. 5 is a block diagram illustrating a segment based temporal fingerprint generator in accordance with an illustrative embodiment. Temporal segment based fingerprint generator 302 receives video frames 501 associated with either test video or known copyrighted content. Frame-based features 502 is a software component associated with temporal segment based fingerprint generator 302 that extracts content-based features 503 for each frame. Content-based features 503 may be only visual features, only audio features, or a combination of visual and audio features.

Event detection 504 is a software component for detecting events based on significant change in content-based features 503. Event detection 504 creates overlapping segments spanning multiple events based on duration constraints. The segments are defined by event boundaries 505. In other words, event detection 504 detects and extracts events in video frames 501 based on a significant change of state in the audio-visual content of a video clip. For example, events can mark video shot or scene transitions, speaker changes, or can be based simply on overall frame or audio intensity changes. In other words, event detection 504 may detect events using video shot detection, scene changes, speaker changes, audio changes, and frame intensity changes. Event detection 504 may also detect events using audio features, visual features, and multi-modal features.

Temporal segment based fingerprint generator 302 then uses the events to form temporal, event-based segments, which can span multiple events, can be disjointed or overlapping, and can cover the entire video or only a subset of the video. The temporal, event-based segments may also overlap with one or more other temporal, event-based segments. In matching, the subset of temporal, event-based segments produce a linear fit that spans a subset of frames in the plurality of frames. The matching temporal, event-based segments can be separated by gaps.

Segment extraction 506 creates a time series of features for each segment to form segment time series 507. Segment extraction 506 associates each temporal, event-based segment with a temporal trace of content-based features extracted from the frames of each temporal, event-based segment. For example, one visual content-based feature is the overall frame intensity corresponding to the sum of the red, green, and blue color values in the frame pixels. The time series signal can be based on temporal tracking of overall frame intensity, tracking of frame region-based intensity sequences, tracking of grid-based intensity sequences, and/or tracking of adjacent frame differences.

Thus, a time series of frame-based descriptors is constructed for each segment to form segment time series 507. The descriptors can be as simple as overall frame intensity, or can be more complex features based on color, texture, edges, and shape characteristics.

Segment based features 508 then extracts segment based temporal fingerprints for each temporal segment to form temporal segment based fingerprints 509. Segment based features 508 does this by extracting fixed-dimensionality temporal segment based fingerprints from the time series of descriptors associated with each segment. The fixed-dimensionality fingerprints can be extracted by a variety of methods for reducing a variable length time series into a fixed-dimensionality feature vector, including but not limited to, uniform sampling, vector quantization, piece-wise linear approximation, Discrete Cosine Transform (DCT), Discrete Wavelet Transform (DWT), and Discrete Fourier Transform (DFT).

Figure 6:
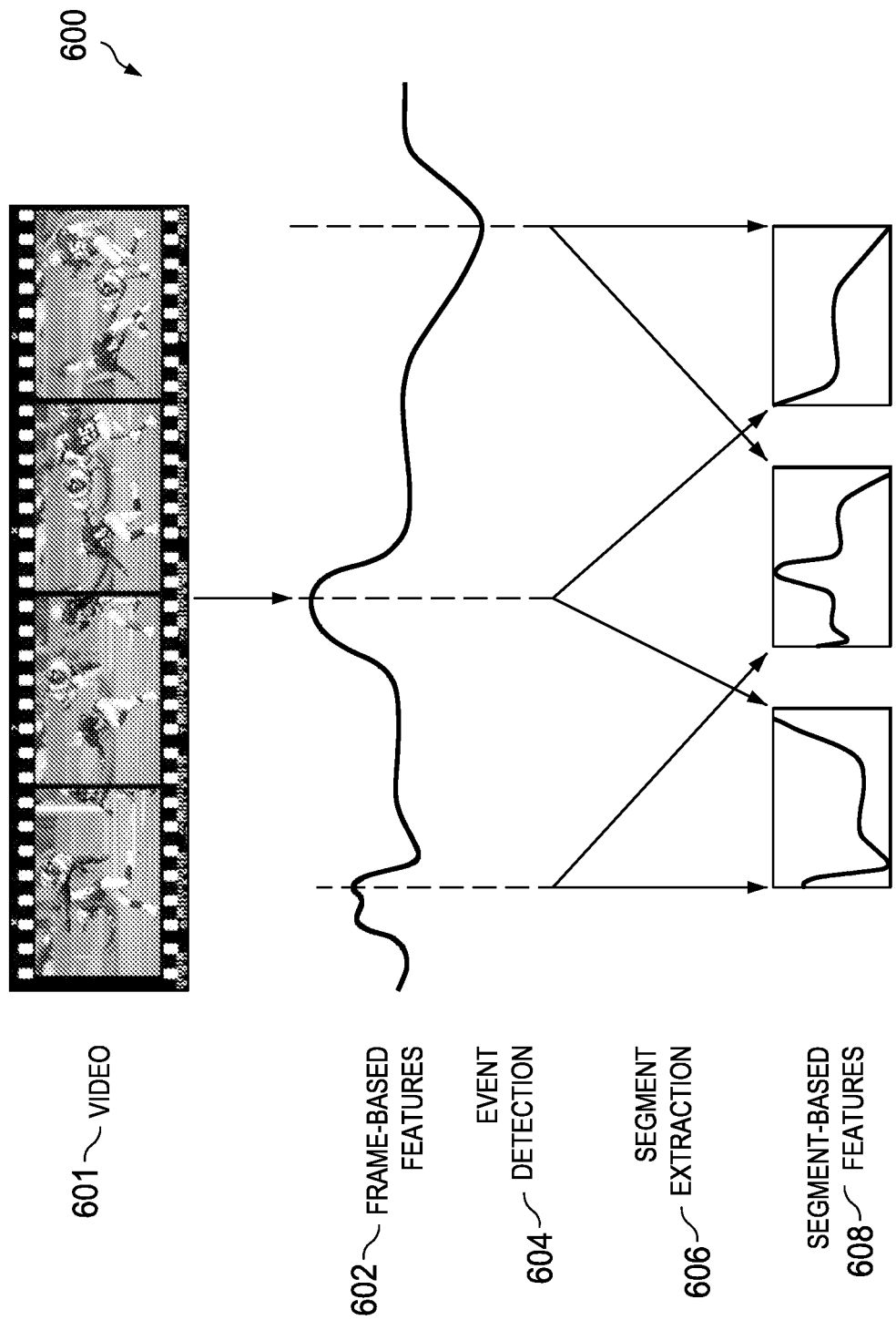
FIG. 6 is a graph illustrating a fingerprint extraction process in accordance with an illustrative embodiment.

Turning now to FIG. 6, a graph illustrating a fingerprint extraction process is shown in accordance with an illustrative embodiment. Graph 600 is a graph of a fingerprint extraction process implemented by a temporal segment based fingerprint generator, such as temporal segment based fingerprint generator 302 in FIG. 3.

Video 601 may be test video or known copyrighted content. Frame-based features 602 are software for extracting features from video 601, such as frame-based features 502 in FIG. 5. Frame-based features 602 processes video 601 into frames, and the sum of red/green/blue values is extracted for each frame of the video, resulting in a time series signal. Event detection 604 detects events in this signal, based on a threshold and zero crossing of the derivative of the signal. Segment extraction 606 creates overlapping segments spanning event to event based on minimum and maximum duration constraints on the segments. In this example, segment based features 608 sub-samples the signal for each segment at 64 evenly spaced points in time, resulting in a fingerprint for the video that is the set of segments and their corresponding 64 dimensional vectors. However, segment based features 608 may sub-sample the signal for each segment at any number of points in time or otherwise produce a fixed dimensionality vector.

The use of the red/green/blue sum as the frame-based feature provides invariance or robustness with respect to many differences including, but not limited to, black bands around the video, differences in aspect ratio, tag lines or fixed text overlaid onto the video, net brightening or darkening of the video, AGC as long as the gain does not change too rapidly, color space transformations, differences in resolution and DC offset.

The use of event detection based on change provides invariance to both spatial and temporal differences. Even though the test video may be edited and may be on a different time scale, event detection 604 should find that the test signal changes at similar points in time.

The use of overlapping segments spanning multiple events also provides invariance to both spatial and temporal differences. Even though the test video may be degraded and may be on a different time scale, segment extraction 606 should find the overlapping segments spanning multiple events based on similar short sequences of changes.

FIG. 7 is a block diagram of a fingerprint matching engine in accordance with an illustrative embodiment. Fingerprint matching engine 314 receives temporal segment based fingerprints for test segments 704. Fingerprint search and comparison 705 is a software component for identifying reference segments matching a test video for utilization in a comparison to determine if the test video is a copy or derivative of the identified reference segments.

For each test segment, fingerprint search and comparison 705 finds matching reference segments. Reference segments 706 are segments of known copyrighted video content. For each reference segment in reference segments 706, fingerprint search and comparison 705 collects all matching segments 708. In other words, test segments 704 are compared to reference segments 706 in the descriptor database and the closest matching reference segments are found using an exact or approximate nearest neighbor search to form matching segments 708.

Linear fit analysis 710 finds the subset of matching segments that produces the best linear fit to form filtered matching segments 712. In other words, linear fit analysis 710 analyzes test segments 704 for their linear fit to each reference video. For each reference video, linear fit analysis 710 filters the subset of test segments and matching reference segments with the longest duration linear fit to form filtered matching segments 712.

The use of linear fit analysis 710 provides invariance to spatial and temporal differences. Even though the test video may be edited, the linear fit requires that the segments be temporally aligned but not necessarily contiguous.

For each test video, matched video scoring 714 computes an overall matching score based on the reference video with the best linear fit to form match score 716. Matched video scoring 714 uses filtered matching segments 712 to compute the best match score 716 against the descriptor database. The best match score 716 is used to detect whether or not the test video is a copyrighted video.

Threshold score comparison engine 718 compares match score 716 with a threshold score to determine if the test video is a copy or derivative of copyrighted content. For example, if match score 716 is equal to or greater than the threshold score, threshold score comparison engine 718 identifies the test video as a copy or derivative of copyrighted content in reference segments 706.

Figure 8:
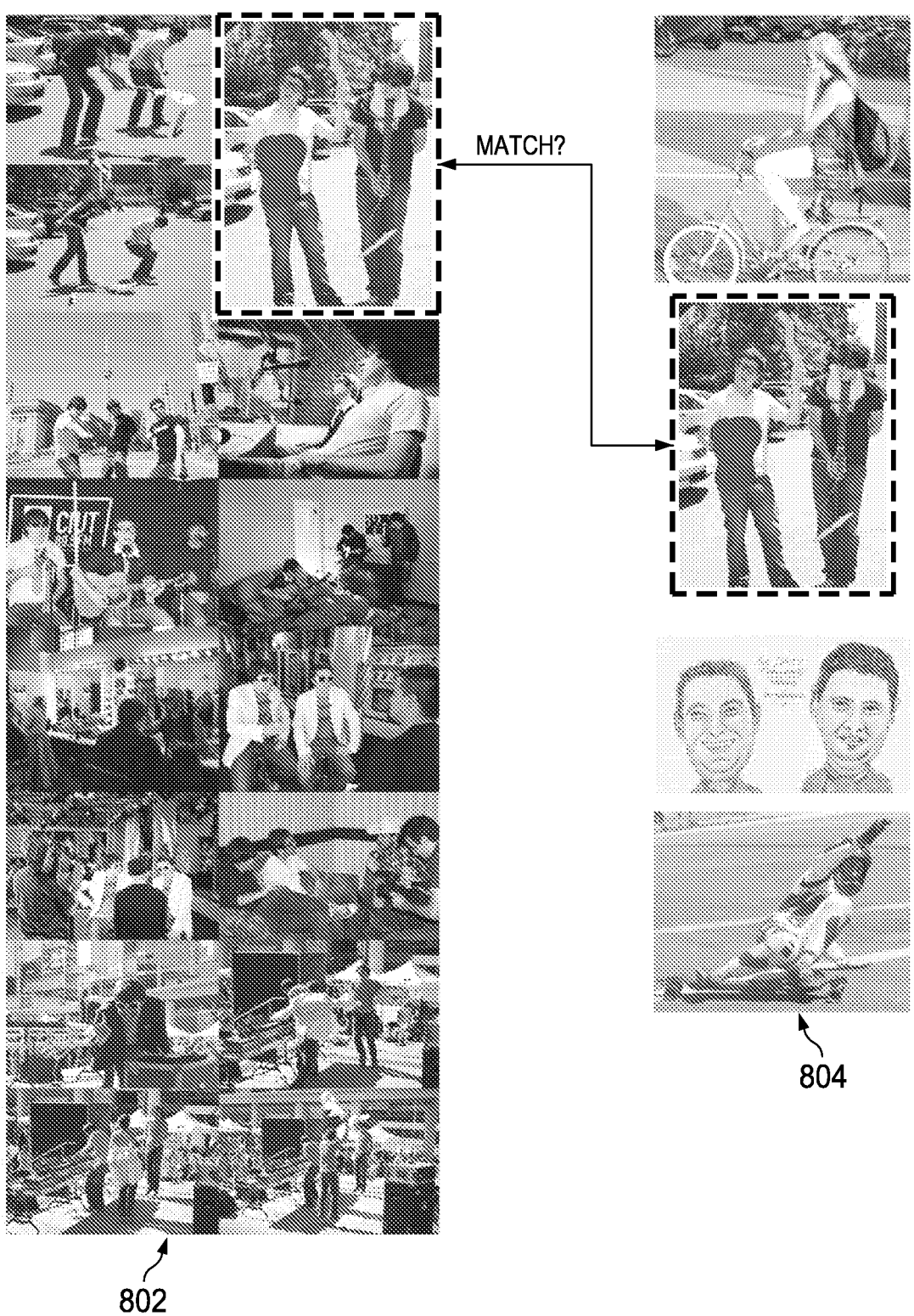
FIG. 8 is a block diagram illustrating a matching process in accordance with an illustrative embodiment.

Referring now to FIG. 8, a block diagram illustrating a matching process is shown in accordance with an illustrative embodiment. Comparison 800 is an illustration of a match process. A fingerprint matching engine, such as fingerprint matching engine 314 in FIG. 3 leverages the extracted temporal segment based fingerprints to compare and match video clips 802 and 804. Video clip 802 is known reference video from a repository of copyrighted content, such as copyrighted content 314 in FIG. 3. Video clip 804 is an unknown test video, such as test video 304 in FIG. 3.

Similar fingerprints can be used to identify matching segments between unknown test video 804 and known reference video 802. The collection and combined duration of matching segments from each candidate reference video can in turn be used to score the overall match quality between test video 804 and the candidate reference video 802. Any candidate reference videos scoring sufficiently high can then be declared near-duplicates to the unknown test video, and test video 804 is then flagged as derivative of copyrighted content.

Figure 9:
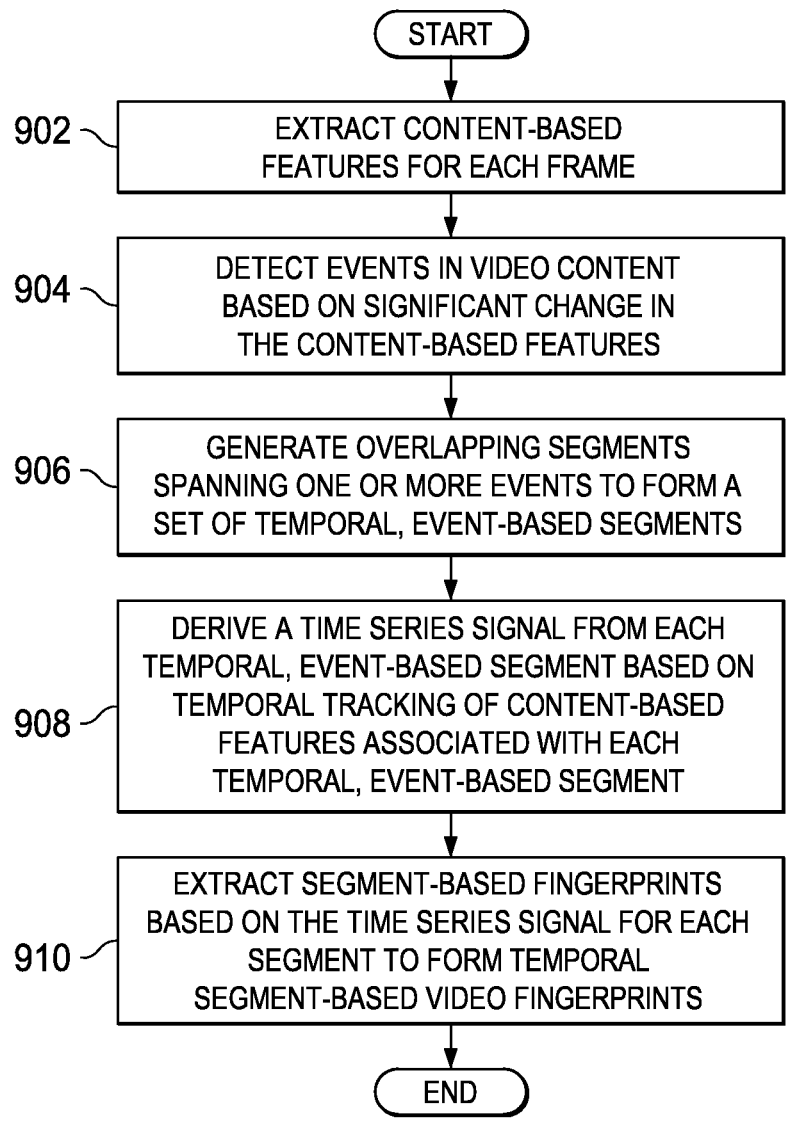
FIG. 9 is a flowchart illustrating a process for extracting segment based temporal fingerprints in accordance with an illustrative embodiment.

FIG. 9 is a flowchart illustrating a process for extracting segment based temporal fingerprints in accordance with an illustrative embodiment. The process in FIG. 9 is implemented by software for generating temporal segment based fingerprints, such as temporal segment based fingerprint generator 302 in FIG. 3.

The process begins by extracting content-based features for each frame in a video content (step 902). The video content may be a test video or known copyrighted video content.

The video content may be video frames only, audio only, or a combination of audio and video frames. The content-based features are visual features, audio features, or a combination of visual and audio features.

The process detects events in the video content based on significant change in the content-based features (step 904). The process then generates overlapping segments spanning one or more events based on duration constraints to form a set of temporal event-based segments (step 906). The set of temporal, event-based segments is a set of two or more event-based segments.

The process derives a time series signal from each temporal, event based segment in the set of temporal, event-based segments based on temporal tracking of content-based features associated with each temporal, event-based feature (step 908). The process then extracts segment based temporal fingerprints for each segment to form temporal segment based video fingerprints for the video content (step 910) with the process terminating thereafter. In other words, the process in FIG. 9 generates one or more temporal segment based fingerprints for a given video clip. The process in FIG. 9 may be performed any number of times to generate a plurality of temporal segment based fingerprints for test video clips and/or for known copyrighted content.

Figure 10:
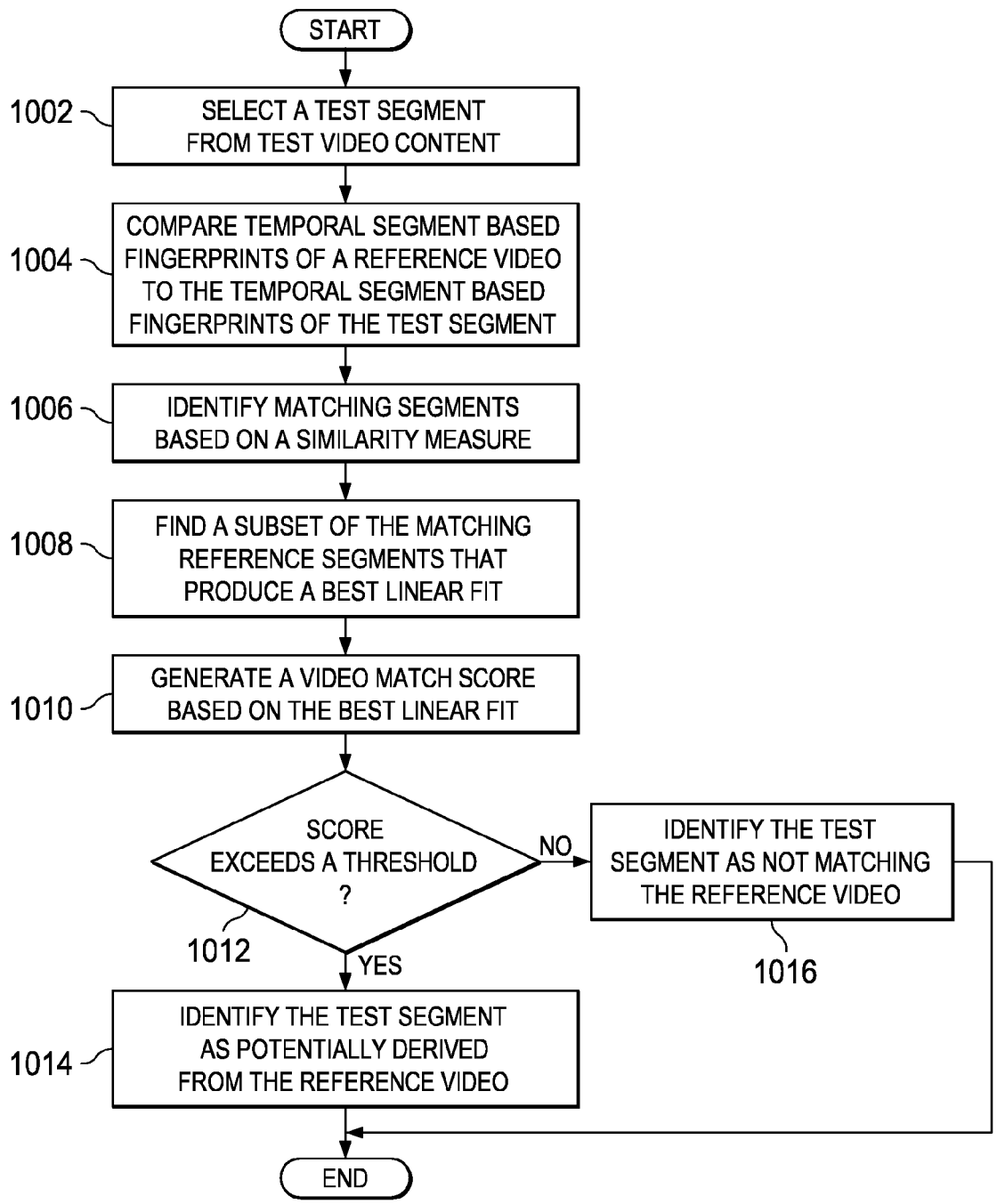
FIG. 10 is a flowchart illustrating a process for determining whether a test segment matches a reference video using temporal segment based fingerprints in accordance with an illustrative embodiment.

FIG. 10 is a flowchart illustrating a process for determining whether a test segment matches a reference video using temporal segment based fingerprints in accordance with an illustrative embodiment. The process in FIG. 10 is implemented by software for matching temporal segment based fingerprints, such as fingerprint matching engine 320 in FIG. 3.

The process begins by selecting a test segment from test video content (step 1002). The process compares temporal segment based fingerprints of a reference video to the temporal segment based fingerprints of the test segment (step 1004). The process identifies matching segments based on a similarity measure (step 1006). The process finds a subset of the matching reference segments that produces a best linear fit (step 1008).

The process then generates a video match score based on the best linear fit (step 1010). The process makes a determination as to whether a match score of the test video exceeds a threshold (step 1012). If the score exceeds the threshold, the process identifies the test segment as potentially derived from the reference video (step 1014) with the process terminating thereafter.

Returning to step 1012, if the match score does not exceed the threshold, the process identifies the test segment as not matching the reference video (step 1016) with the process terminating thereafter. In other words, if the match score is too low, the process does not identify the test video as being a copy or a derivative of the copyrighted content associated with the reference video.

The illustrative embodiments provide a computer implemented method, apparatus, and computer program product code for temporal, event-based video fingerprinting. In one embodiment, events in video content are detected. The video content comprises a plurality of video frames. An event represents discrete points of interest in the video content. A set of temporal, event-based segments are generated using the events. Each temporal, event-based segment is a segment of the video content covering one or more events. A time series signal is derived from each segment based on temporal tracking of content-based features of the frames associated with the each temporal, event-based segment. A segment fingerprint is derived based on the time series signal for each temporal, event-based segment to form a set of temporal segment based fingerprints associated with the video content.

The temporal segment based fingerprints for test video clips are compared to temporal segment based fingerprints for each reference video. All matching pairs are found. The subset of matching pairs that produce a good linear fit are used to score the match to a candidate reference video.

The temporal, segment based fingerprints may be used for content-based video piracy detection or video piracy prevention purposes. The temporal segment based fingerprints generated by this process may also be used for content-based search, concept detection, content summarization, filtering, routing, or targeted advertising. The segment based temporal fingerprinting is more robust to editing operations, such as cuts, inserts, and splices. In other words, segment based temporal fingerprinting can more accurately and reliably detect copies and derivatives, even when the video content has been subjected to editing operations and alterations to the copyrighted video content.

Thus, the embodiments improve robustness with respect to editing and image processing transformations by combining content-based features with the unique temporal signatures of videos. Robustness is increased by detecting important events in the video, forming segments aligned at event boundaries, and for each segment extracting temporal traces of content-based descriptors. Aligning the segments at invariant event boundaries alleviates the afore-mentioned frame alignment problem. Allowing the segments to span a variable number of events, and to overlap with each other, provides a level of redundancy that leads to increased robustness with respect to editing operations. The incorporation of temporal trace signatures into the fingerprints reduces the dependency on the fingerprints and, therefore, allows for increased robustness with respect to image processing transformations.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for temporal, event-based video fingerprinting, the computer implemented method comprising:
   extracting content-based features from video content, wherein the video content comprises a plurality of video frames and the content-based features are extracted from each frame of the plurality of video frames;
   detecting events in the content-based features, wherein each event of the events represents discrete points of interest in the video content;
   generating a set of temporal, event-based segments using the events, wherein each temporal, event-based segment is a segment of the video content covering a set of the events that span a set of at least two frames of the plurality of video frames and is aligned at an event boundary;
   deriving a time series signal from each temporal, event-based segment in the set of temporal, event-based segments using temporal tracking of the content-based features of multiple frames associated with the each temporal, event-based segment; and
   extracting a segment fingerprint based on the time series signal for the each temporal, event-based segment to form a set of temporal segment based fingerprints associated with the video content.

2. The computer implemented method of claim 1 wherein the set of temporal segment based fingerprints are used to determine if a portion of a first video clip is derived from a same original content as a second video clip, the computer implemented method further comprising:
   comparing temporal segment based fingerprints for the first video clip with temporal segment based fingerprints generated for the second video clip;
   identifying matching event-based segments based on a similarity measure between a temporal segment-based fingerprint associated with the first video clip and a temporal segment based fingerprint associated with the second video clip to form a matching segment;
   collecting all matching segments between the first video clip and the second video clip to form a set of matching segments;
   selecting a subset of matching segments, wherein the subset of matching segments comprises matching segments associated with the first video clip that produces a good linear fit to matching segments associated with the second video clip;
   identifying an overall video match score for the first video clip and the second video clip based on the selected matching segments; and
   determining whether the first video clip is a near-duplicate of the second video clip using the overall video match score.

3. The computer implemented method of claim 2 further comprising:
   comparing the overall video match score to a threshold score; and
   responsive to the overall video match score exceeding the threshold score, identifying the first video clip as a near-duplicate of the second video clip.

4. The computer implemented method of claim 1 wherein the temporal segment based fingerprints are used for at least one of content-based search, concept detection, content categorization, summarization, filtering, routing, or targeted advertising.

5. The computer implemented method of claim 1 wherein the content-based features comprises at least one of audio features and visual features, and wherein each event is detected based on at least one of video shot detection, scene changes, speaker changes, audio changes, frame intensity changes, or changes based on low-level content-based descriptors of color, texture, shape, edges, or motion.

6. The computer implemented method of claim 1 wherein the temporal, event-based segments span a set of frames in the plurality of video frames, and wherein the set of frames covers only a subset of the video content.

7. The computer implemented method of claim 1 wherein a first temporal, event-based segment associated with the video content overlaps with a second temporal, event-based segment associated with the video content, wherein the events describe a significant change of state in at least one of audio content of the video, visual content of the video, and semantic content of the video.

8. The computer implemented method of claim 1 wherein the time series signal is based on at least one of temporal tracking of overall frame intensity, tracking of frame region-based intensity sequences, tracking of grid-based intensity sequences, and tracking of adjacent frame differences.

9. The computer implemented method of claim 1 wherein the temporal segment based fingerprints are extracted from the segment time series based on at least one of uniform sampling, piece-wise linear approximation, Discrete Cosine Transform (DCT), Discrete Wavelet Transform (DWT), and Discrete Fourier Transform (DFT).

10. The computer implemented method of claim 1 wherein a temporal segment based fingerprint comprises a fixed-dimensionality feature vector.

11. The computer implemented method of claim 1 wherein an event describes a significant change of state in at least one of audio content of the video, visual content of the video, and semantic content of the video.

12. A non-transitory computer program product for temporal, event-based video fingerprinting, the computer program product comprising:
   a computer readable medium;
   program code stored on the computer readable medium for extracting content-based features from video content, wherein the video content comprises a plurality of video frames and the content-based features are extracted from each frame of the plurality of video frames;
   program code stored on the computer readable medium for detecting events in the content-based features, wherein each event of the events represents discrete points of interest in the video content;

program code stored on the computer readable medium for generating a set of temporal, event-based segments using the events, wherein each temporal, event-based segment is a segment of the video content covering a set of the events that span a set of at least two frames of the plurality of video frames and is aligned at an event boundary;

program code stored on the computer readable medium for deriving a time series signal from each temporal, event-based segment in the set of temporal, event-based segments using temporal tracking of the content-based features of multiple frames associated with the each temporal, event-based segment; and program code stored on the computer readable medium for extracting a segment fingerprint based on the time series signal for each temporal, event-based segment to form a set of temporal segment based fingerprints associated with the video content.

13. The computer program product of claim 12 wherein the set of temporal segment based fingerprints are used to determine if a portion of a first video clip is derived from a same original content as a second video clip, the computer program product further comprising:

program code stored on the computer readable medium for comparing temporal segment based fingerprints for the first video clip with temporal segment based fingerprints generated for the second video clip;

program code stored on the computer readable medium for identifying matching event-based segments based on a similarity measure between a temporal segment-based fingerprint associated with the first video clip and a temporal segment based fingerprint associated with the second video clip to form a matching segment;

program code stored on the computer readable medium for collecting all matching segments between the first video clip and the second video clip to form a set of matching segments;

program code stored on the computer readable medium for selecting a subset of matching segments, wherein the subset of matching segments comprises matching segments associated with the first video clip that produces a good linear fit to matching segments associated with the second video clip;

program code stored on the computer readable medium for identifying an overall video match score for the first video clip and the second video clip based on the selected matching segments in the subset of matching segments; and program code stored on the computer readable medium for determining whether the first video clip is a near-duplicate of the second video clip using the overall video match score.

14. The computer program product of claim 13 further comprising:

program code stored on the computer readable medium for comparing the overall video match score to a threshold score;

program code stored on the computer readable medium for identifying the first video clip as a near-duplicate of the second video clip in response to the overall video match score exceeding the threshold score.

15. The computer program product of claim 12 wherein the content-based features comprises at least one of audio features and visual features, and wherein each event is detected based on at least one of video shot detection, scene changes, speaker changes, audio changes, frame intensity changes, or changes based on low-level content-based descriptors of color, texture, shape, edges, or motion.

16. An apparatus for automatically detecting video piracy, the apparatus comprising:

a bus system;

a communications system coupled to the bus system;

a memory connected to the bus system, wherein the memory includes computer usable program code; and a processing unit coupled to the bus system, wherein the processing unit executes the computer usable program code to extract content-based features from video content, wherein the video content comprises a plurality of video frames and the content-based features are extracted from each frame of the plurality of video frames, detect events in the content-based features, wherein each event of the events represents discrete points of interest in the video content; generate a set of temporal, event-based segments using the events, wherein each temporal, event-based segment is a segment of the video content covering a set of the events that span a set of at least two frames of the plurality of video frames and is aligned at an event boundary; derive a time series signal from each temporal, event-based segment in the set of temporal, event-based segments using temporal tracking of the content-based features of multiple frames associated with the each temporal, event-based segment; and extract a segment fingerprint based on the time series signal for each temporal, event-based segment to form a set of temporal segment based fingerprints associated with the video content, wherein detection of the near-duplicate is used for content-based video piracy detection.

17. The apparatus of claim 16 wherein the processing unit further executes the computer usable program code to compare temporal segment based fingerprints for the first video clip with temporal segment based fingerprints generated for the second video clip; identify matching event-based segments based on a similarity measure between a temporal segment-based fingerprint associated with the first video clip and a temporal segment based fingerprint associated with the second video clip to form a matching segment; collect all matching segments between the first video clip and the second video clip to form a set of matching segments; select a subset of matching segments, wherein the subset of matching test segments produces a good linear fit to the matched video; identify an overall video match score for the first video clip and the second video clip based on the selected matching segments in the subset of matching segments; and determine whether the first video clip is a near-duplicate of the second video clip using the overall video match score.

18. The apparatus of claim 17 wherein the processing unit further executes the computer usable program code to compare the overall video match score to a threshold score; and identify the first video clip as a near-duplicate of the second video clip in response to the overall video match score exceeding the threshold score.

* * * * *